C. F. BACKSTRAND & C. M. HOAG.
CALCULATOR.
APPLICATION FILED JULY 12, 1915.

1,157,609.

Patented Oct. 19, 1915.

INVENTORS
C. F. BACKSTRAND.
AND C. M. HOAG.
by _____
ATTORNEY.

UNITED STATES PATENT OFFICE.

CLARENCE F. BACKSTRAND AND CHANCE M. HOAG, OF RIVERSIDE, CALIFORNIA.

CALCULATOR.

1,157,609.   Specification of Letters Patent.   Patented Oct. 19, 1915.

Application filed July 12, 1915.   Serial No. 39,290.

*To all whom it may concern:*

Be it known that we, CLARENCE F. BACKSTRAND and CHANCE M. HOAG, both citizens of the United States, residing at the city of Riverside, in the county of Riverside and State of California, have invented a new and useful Calculator, of which the following is a specification.

The object of our invention is to provide a new and improved calculator more especially designed for determining the power factor of load, phase angle, and meter power factors on three phased balanced electrical circuits, together with the calculations of power factors under which two transformers are operating when connected V or open delta, on a three phase circuit at various load power factors.

Figure 1:
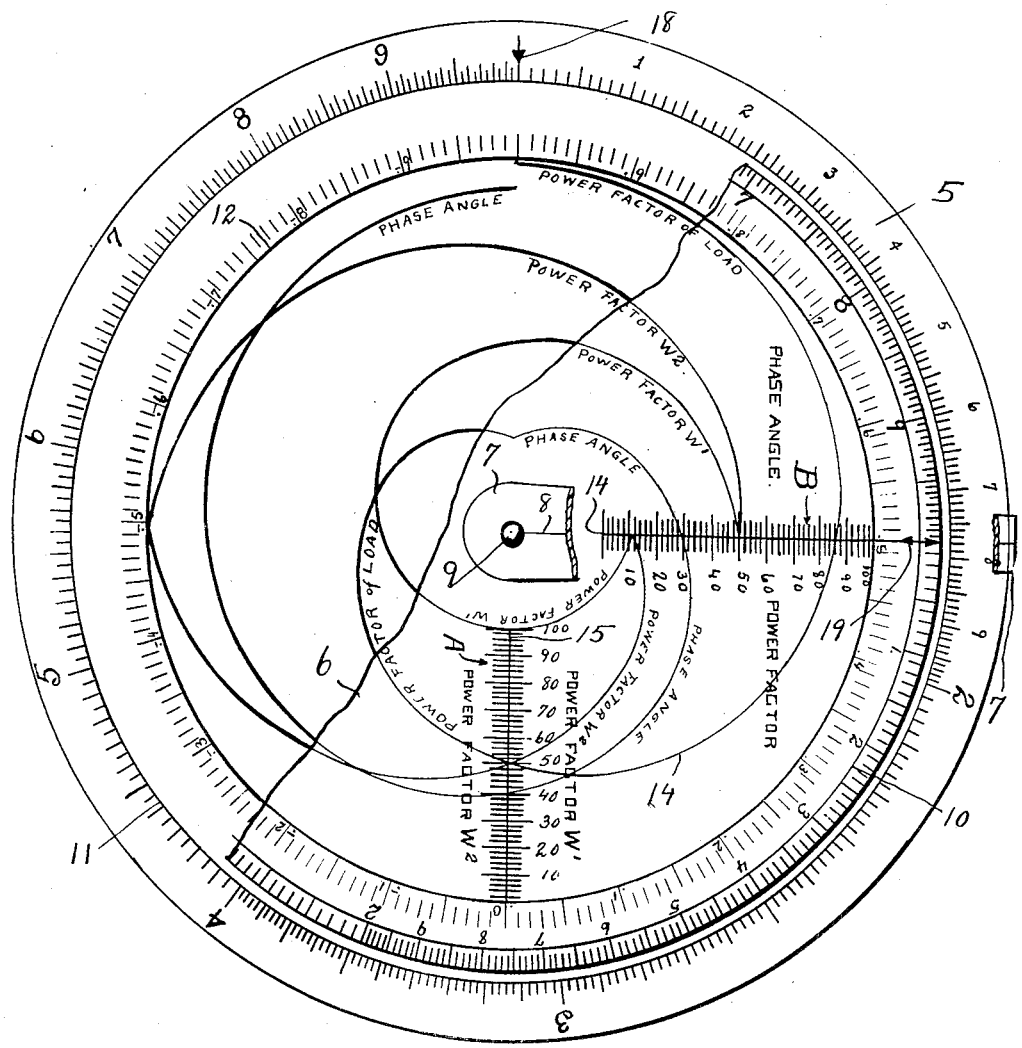
Figure 2:
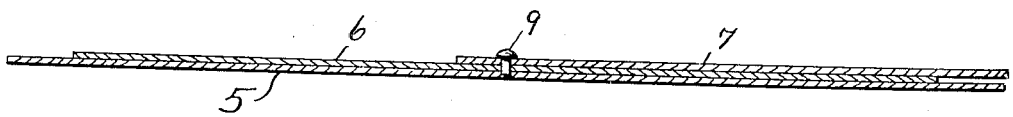

The practical embodiment of our invention is represented in the accompanying drawings forming a part hereof in which:

Figure 1 is a plan with portions broken out for clearness of illustration. Fig. 2 is a central section through all the parts.

Our calculator comprises two disks 5 and 6 of celluloid or other suitable material, the upper disk being transparent, and a radial transparent arm 7 provided with a hair line index 8. Disk 5 and arm 7 are revolubly mounted on a pivot 9 which pivot may be rigidly or revolubly mounted in the center of disk 5. Disk 6 is preferably of less diameter than disk 5 and near its outer edge is a circle 10 which is divided into a logarithmic scale. On disk 5 is a circle 11 which is divided into a logarithmic scale. Circle 11 with its scale is preferably just beyond circle 10 when the parts are positioned for use. On disk 5 within circle 10 of disk 6 is a circle 12 which is divided into a ratio scale showing ratios from 0 to 1 plus and from 0 to 1 minus. The ratio circle is divided into twenty equal parts and each of these parts is subdivided into ten equal parts. On disk 6 are radial lines 14 and 15, ninety degrees apart which extend from circle 12 to the center of disk 6. The outer seventeen twenty-thirds of these lines is divided into graduations of one hundred parts marked from 0 to 100 and are percentage scales. Scale B is the phase angle and power factor scale and reads from 0 at the inner end to 100 at the outer end and is called the vertical scale. Scale A is the power factor $W^1$ and $W^2$ scale and reads from 100 at the inner end to 0 at the outer end and is called the horizontal scale. On disk 5 between ratio scale circle 12 and a circle cutting the radial lines at the inner ends of the percentage scales are the power factor of load curve 14, the phase angle curve 15, the power factor curve $W^1$ and the power factor curve $W^2$. With scale B set on the vertical above the pivot these curves are developed as follows: The phase angle curve starts at 0 on scale B, makes one complete volute revolution and ends at 90. The power factor of load curve starts at 100, makes one complete volute revolution and ends at 0. Power factor curve $W^1$ starts at $86\frac{6}{10}$ on scale A, starting downwardly, makes a complete volute revolution and ends at 50. Power factor curve $W^2$ starts at the same point and starting downwardly by a volute curve reaches circle 12 on the horizontal and by a volute curve comes back to scale A at 50. Disk 5 has an index 18 which is the starting point for the use of the scales and curves on that disk. Disk 6 has an index 19 which is the starting point for the use of the scales on that disk and these two indices are in register at the commencement of any calculations made by the use of our device and are placed on the vertical above the pivot. The four curves are read with one setting when the index on disk 6 is moved to a position to register with the proper point on the ratio scale. The curves are read under the two percentage scales on disk 6, the scales being tilted to correspond with the four curves.

In further explanation of the operation of our calculator, assume, for example, the speed of the disk on one element of a polyphase watt hour meter, or the speed of one single phase watt hour meter, where two are used to measure the power on a three phase circuit, to be 18 revolutions per minute, and the speed of the other element or the other single phase meter to be 9 revolutions per minute. By setting 18 on the scale B, opposite 9 on scale A read ratio .5 on scale A opposite the index on scale B. Then set index on scale B opposite .5 on the ratio scale and read at the intersection of the power factor of load curve and the vertical scale power factor of load 86.6%. With the same setting read at the intersection of the phase angle curve and the vertical scale phase angle (phase displacement between line voltage and current) 30 degrees. At the intersection of curve power factor $W^1$ and the horizontal scale, read power factor $W^1$ 100%

(power factor under which the higher reading element is operating). At the intersection of curve power factor W² and the horizontal scale read power factor W¹ 50% (power factor under which the lower reading element is operating).

When used for determining power factor on transformers when connected open delta, it is only necessary to set the power factor of load curve under the load power factor on the vertical scale and the two transformer power factors may be read on the curves power factor W¹ and power factor W² under the horizontal scale. The two curves power factor of load and phase angle may also be used as a table of sines and cosines by setting the phase angle curve under any angle on its vertical scale, the cosine may be read directly over the curve power factor of load on the same scale. By subtracting the angle from 90 degrees and setting the remainder on phase angle, the sine may be read in the same manner as the cosine.

Having described our invention what we claim is:

1. A calculator comprising a disk having delineated thereon a circular logarithmic scale; a circular ratio scale showing ratios from 0 to 1 plus and 0 to 1 minus; a power factor of load curve; phase angle curve; power factor W¹ curve; power factor W² curve; and an index point; a transparent disk revolubly mounted on said first disk centrally of the scales thereon, said transparent disk having delineated thereon an index point; a circular logarithmic scale; and two percentage scales comprising a straight vertical and a straight horizontal scale, the vertical scale being at right angles to the horizontal scale; and a transparent arm having a radial hair line index thereon, said arm being revolubly and centrally mounted on said disks, substantially as herein described.

2. A calculator comprising a disk having delineated thereon a circular logarithmic scale, a circular ratio scale showing ratios from 0 to 1 plus and 0 to 1 minus, a power factor of load curve, phase angle curve, power factor W¹ curve, power factor W² curve, and an index point; a transparent disk revolubly mounted on said first disk centrally of the scales thereon, said transparent disk having delineated thereon an index point, a circular logarithmic scale, and two percentage scales comprising a straight vertical and a straight horizontal scale, substantially as herein described.

In witness that we claim the foregoing we have hereunto subscribed our names this 6th day of May, 1915.

CLARENCE F. BACKSTRAND.
CHANCE M. HOAG.

Witnesses:
H. T. GROUT,
C. C. VAN FLEET.